(12) United States Patent
Lim et al.

(10) Patent No.: US 12,335,273 B2
(45) Date of Patent: Jun. 17, 2025

(54) METHOD OF VERIFYING THE INTEGRITY OF AN APPLICATION IN A VEHICLE CONTROLLER

(71) Applicants: HYUNDAI MOTOR COMPANY, Seoul (KR); KIA CORPORATION, Seoul (KR); HYUNDAI AUTOEVER CORP., Seoul (KR)

(72) Inventors: Hong Yeol Lim, Incheon (KR); Bong Ju Kim, Yongin-si (KR)

(73) Assignees: HYUNDAI MOTOR COMPANY, Seoul (KR); KIA CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 241 days.

(21) Appl. No.: 18/070,017

(22) Filed: Nov. 28, 2022

(65) Prior Publication Data

US 2024/0007480 A1 Jan. 4, 2024

(30) Foreign Application Priority Data

Jul. 4, 2022 (KR) .......................... 10-2022-0081939

(51) Int. Cl.
*H04L 9/40* (2022.01)
*G06F 15/16* (2006.01)
*H04L 9/06* (2006.01)
*H04L 9/08* (2006.01)
*H04L 9/32* (2006.01)
*H04L 15/16* (2006.01)

(52) U.S. Cl.
CPC .......... *H04L 63/123* (2013.01); *H04L 9/0643* (2013.01); *H04L 63/062* (2013.01); *H04L 2209/84* (2013.01)

(58) Field of Classification Search
CPC ... H04L 63/123; H04L 9/0643; H04L 63/062; H04L 2209/84; H04L 9/3236; H04L 9/3242; G06F 21/51; G06F 21/602; G06F 21/629
USPC .......................................... 713/189
See application file for complete search history.

(56) References Cited

U.S. PATENT DOCUMENTS

| | | | |
|---|---|---|---|
| 2018/0234248 A1* | 8/2018 | Imamoto | H04L 63/0428 |
| 2019/0068582 A1* | 2/2019 | Kim | G01S 5/0072 |
| 2021/0155173 A1* | 5/2021 | Harata | G06F 8/654 |

FOREIGN PATENT DOCUMENTS

EP 4383110 A1 * 6/2024 ............. G06F 21/62

* cited by examiner

*Primary Examiner* — David R Lazaro
*Assistant Examiner* — Berhanu Shitayewoldetadik
(74) *Attorney, Agent, or Firm* — Lempia Summerfield Katz LLC (57) ABSTRACT

Disclosed is a method of verifying the integrity of an app mounted on an autonomous driving-related vehicle controller. The method includes: providing each of autonomous driving-related vehicle controllers with a hash table in which hash values for logic of the autonomous driving-related vehicle controllers are recorded; transmitting, by a first vehicle controller, an old hash value and a new hash value to a second vehicle controller when a hash value for logic of the first vehicle controller is changed; and changing, by the second vehicle controller, the old hash value to the new hash value in a hash table provided in the second vehicle controller.

10 Claims, 8 Drawing Sheets

| MCU_ID | MCJ_Version | Logic_ID | Logic_Version | Command | Logic_Hash |

METHOD OF VERIFYING THE INTEGRITY OF AN APPLICATION IN A VEHICLE CONTROLLER

CROSS-REFERENCE TO RELATED APPLICATION

This application claims the benefit of and priority to Korean Patent Application No. 10-2022-0081939, filed in the Korean Intellectual Property Office on Jul. 4, 2022, the entire contents of which are incorporated herein by reference.

TECHNICAL FIELD

The present disclosure relates to a technology for verifying the integrity of an app mounted on an autonomous driving-related vehicle controller.

BACKGROUND

As the functions related to acceleration, braking, safety, and the like of a vehicle become electronic, various controllers for controlling the functions are mounted on the vehicle. Thus, the types and complexity of software installed in each controller are increased. In particular, even with the same function, different software structures make it difficult to produce a vehicle smoothly, so automotive open system architecture (AUTOSAR) standardized the structure of software installed in each controller.

The AUTOSAR means an open car standard software structure, and provides a secure onboard communication (SecOC) standard for each communication security (e.g., data packet reliability protection) between controllers. In addition, general communication security applicable to each controller includes transport layer security (TLS), Internet protocol security (IPsec), media access control security (MACsec), intrusion detection systems (IDS), intrusion prevention systems (IPS), and the like. In this case, SecOC, TLS, IPsec, and MACsec are security protocols that focus on integrity, whereas the intrusion detection system is a security system that focuses on detecting an attacker's intrusion. The intrusion prevention system is a security system that focuses on preventing an attacker's intrusion.

In general, in an Internet environment to which Linux operating system (OS) is applied, TLS guarantees the integrity of communication between one application (hereinafter, referred to as an app) and another application, but does not guarantee the integrity of "app to app" communication between vehicle controllers to which AUTOSAR OS is applied.

In particular, in the communication between the app installed in a first vehicle controller based on AUTOSAR OS and the app installed in a second vehicle controller based on AUTOSAR OS, because the integrity of each app itself is not guaranteed, the communication security is weak.

The matters described in this background section are provided only to promote understanding of the background of the disclosure and may include matters that are not already known to those of having ordinary skill in the art.

SUMMARY

The present disclosure has been made to solve the above-mentioned problems occurring in the prior art while advantages achieved by the prior art are maintained intact.

An aspect of the present disclosure provides a method of verifying integrity of an app for a vehicle controller that is capable of ensuring the integrity of apps installed in autonomous driving-related vehicle controllers, each of which has a table (hereinafter, a hash table) in which hash values for the logic of autonomous driving-related vehicle controllers are recorded, by exchanging the hash value of the first logic of a first vehicle controller and the hash value of the second logic of a second vehicle controller during communication between the first logic and the second logic. The method further includes determining, by the first vehicle controller, whether the hash value of the second logic is true based on the hash table of the first vehicle; and determining, by the second vehicle controller, whether the hash value of the first logic is true based on the hash table of the second vehicle.

Another aspect of the present disclosure provides a method of verifying integrity of an app for a vehicle controller that is capable of ensuring the integrity of apps installed in autonomous driving-related vehicle controllers, each of which has a table (hereinafter, a hash table) in which hash values for the logic of autonomous driving-related vehicle controllers are recorded, by transmitting a hash value before the change and the hash value after the change to the remaining vehicle controllers when the hash value for the logic of the first vehicle controller is changed. The method further includes: changing, by the remaining vehicle controllers, a hash value of logic of the first vehicle controller in a hash table provided to each of them.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a method of verifying integrity of an app for a vehicle controller includes: providing each of autonomous driving-related vehicle controllers with a hash table in which hash values for logic of the autonomous driving-related vehicle controllers are recorded; transmitting, by a first vehicle controller, an old hash value and a new hash value to a second vehicle controller when a hash value for logic of the first vehicle controller is changed; and changing, by the second vehicle controller, the old hash value to the new hash value in a hash table provided in the second vehicle controller.

According to an embodiment, the transmitting of the old hash value and the new hash value may include generating, by the first vehicle controller and the second vehicle controller, a session key; encrypting, by the first vehicle controller, the old hash value with the session key and transmitting it to the second vehicle controller; receiving, by the first vehicle controller, an OK signal from the second vehicle controller; and encrypting, by the first vehicle controller, the new hash value with the session key and transmitting an encrypted new hash value to the second vehicle controller.

According to an embodiment, the receiving of the OK signal may include decrypting, by the second vehicle controller, the old hash value with the session key, and transmitting, by the second vehicle controller, the OK signal to the first vehicle controller when the old hash value exists in the hash table of the second vehicle controller.

According to an embodiment, the changing of the old hash value to the new hash value may include: decrypting, by the second vehicle controller, the old hash value with the session key; decrypting, by the second vehicle controller, the new hash value with the session key; searching, by the second vehicle controller, the hash table of the second vehicle controller for the old hash value; and changing, by the second vehicle controller, the old hash value to the new hash value in the hash table of the second vehicle controller.

According to an embodiment, the generating of the session key may include: transmitting, by the first vehicle controller, a first Diffie Hellman (DH) parameter and a first random variable to the second vehicle controller; transmitting, by the second vehicle controller, a second DH parameter and a second random variable to the first vehicle controller; generating, by the first vehicle controller, a premaster secret value by using the first DH parameter and the second DH parameter; and combining the premaster secret value with the first random variable and the second random variable to generate the session key; and generating, by the second vehicle controller, a premaster secret value by using the first DH parameter and the second DH parameter, and combining the premaster secret value with the first random variable and the second random variable to generate the session key.

According to an embodiment, the method may further include: calculating, by the second vehicle controller, a digest of the changed hash table; and transmitting, by the second vehicle controller, the digest to the first vehicle controller. The method may further include: calculating, by the first vehicle controller, a digest of the hash table of the first vehicle controller; and transmitting, by the first vehicle controller, an OK signal to the second vehicle controller when the received digest is identical with the digest of the hash table of the first vehicle controller.

According to an embodiment, the method may further include: deleting, by the first vehicle controller, the digest; and deleting, by the second vehicle controller, the digest when the OK signal is received from the first vehicle controller.

According to another aspect of the present disclosure, a method of verifying integrity of an app for a vehicle controller includes: providing each of autonomous driving-related vehicle controllers with a hash table in which hash values for logic of the autonomous driving-related vehicle controllers are recorded, exchanging a hash value of a first logic and a hash value of a second logic in communication between the first logic of a first vehicle controller and the second logic of a second vehicle controller; verifying, by the first vehicle controller, integrity of the hash value of the second logic based on a hash table of the first vehicle controller; and verifying, by the second vehicle controller, integrity of the hash value of the first logic based on a hash table of the second vehicle controller.

According to an embodiment, the exchanging of the hash values may include: generating, by the first vehicle controller and the second vehicle controller, a session key; encrypting, by the first vehicle controller, the hash value of the first logic with the session key; and encrypting, by the second vehicle controller, the hash value of the second logic with the session key.

According to an embodiment, the generating of the session key may include: transmitting, by the first vehicle controller, a first Diffie Hellman (DH) parameter and a first random variable to the second vehicle controller; transmitting, by the second vehicle controller, a second DH parameter and a second random variable to the first vehicle controller; generating, by the first vehicle controller, a premaster secret value by using the first DH parameter and the second DH parameter, and combining the premaster secret value with the first random variable and the second random variable to generate the session key; and generating, by the second vehicle controller, a premaster secret value by using the first DH parameter and the second DH parameter, and combining the premaster secret value with the first random variable and the second random variable to generate the session key.

According to an embodiment, the verifying of the integrity of the hash value of the first logic may include: encrypting, by the second vehicle controller, a verification completion message with the session key when the integrity of the hash value of the first logic is verified; and transmitting, by the second vehicle controller, the encrypted verification complete message to the first vehicle controller.

According to an embodiment, the verifying of the integrity of the hash value of the first logic may further include deleting, by the second vehicle controller, all data used for session generation when a session is terminated.

According to an embodiment, the verifying of the integrity of the hash value of the second logic may include: encrypting, by the first vehicle controller, a verification completion message with the session key when the integrity of the hash value of the second logic is verified; and transmitting, by the first vehicle controller, the encrypted verification complete message to the second vehicle controller.

According to an embodiment, the verifying of the integrity of the hash value of the first logic may further include deleting, by the first vehicle controller, all data used for session generation when a session is terminated.

BRIEF DESCRIPTION OF THE DRAWINGS

The above and other objects, features and advantages of the present disclosure should be more apparent from the following detailed description taken in conjunction with the accompanying drawings.

The drawings described herein are for illustration purposes only and are not intended to limit the scope of the present disclosure in any way.

DETAILED DESCRIPTION

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function has been omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or to perform that operation or function.

Figure 1:
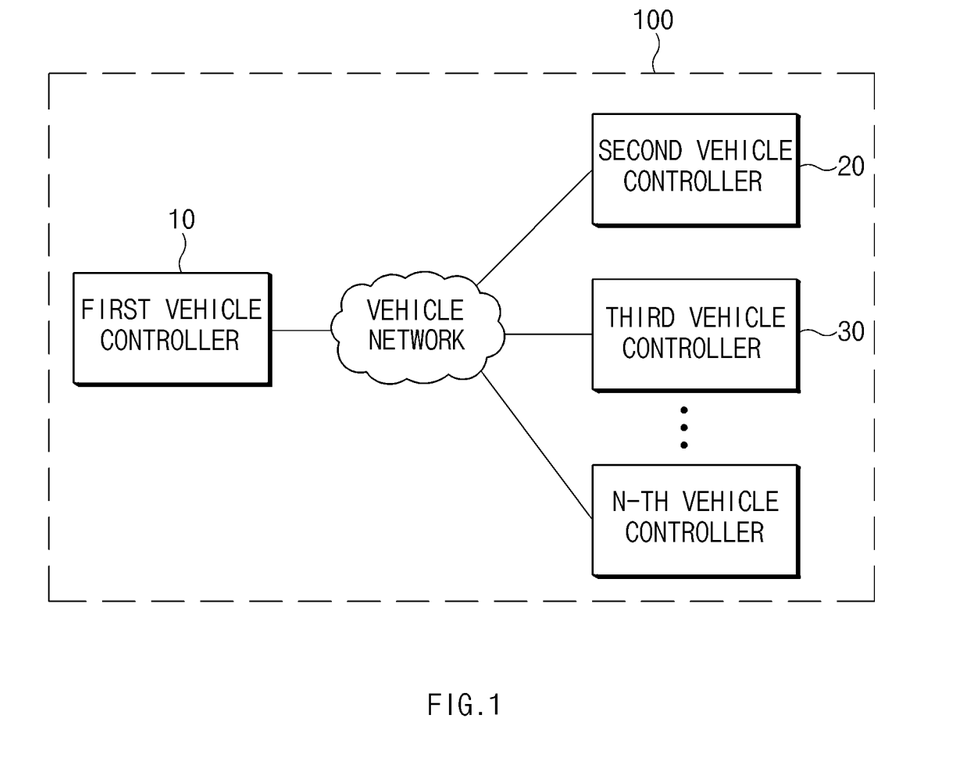
FIG. 1 is a block diagram illustrating an internal network structure of an autonomous vehicle to which an embodiment of the present disclosure is applied.

FIG. 1 is a block diagram illustrating an internal network structure of an autonomous vehicle to which an embodiment of the present disclosure is applied. FIG. 1 illustrates a connection structure of vehicle controllers 10, 20, and 30 involved in autonomous driving. In this case, the internal network of the autonomous vehicle may include a controller area network (CAN), a CAN flexible data-rate (FD), a local interconnect network (LIN), FlexRay, media oriented systems transport (MOST), an Ethernet, and the like.

As shown in FIG. 1, the internal network of an autonomous vehicle 100, as a vehicle controller involved in autonomous driving, may include the first vehicle controller 10, the second vehicle controller 20, the third vehicle controller 30, and the like. In this case, the number of vehicle controllers involved in the autonomous driving is merely an example for helping understanding, but is not limited thereto.

The vehicle controllers 10, 20, and 30 perform a specific function for autonomous driving of a vehicle. For example, the vehicle controllers 10, 20, and 30 may include a micro control unit (MCU), an electronic control unit (ECU), an engine control unit (ECU), a motor control unit (MCU), a transmission control unit (TCU), and the like. In one embodiment, the vehicle controllers 10, 20, and 30 have hash tables in which the same information is recorded, and a hash value for logic of each of the vehicle controllers 10, 20, and 30 is recorded. For reference, an app may be installed in each of the vehicle controllers 10, 20, and 30, and the app may include a plurality of logic.

For example, when the first logic of the first vehicle controller 10 and the second logic of the second vehicle controller 20 communicate with each other, the first vehicle controller 10 transmits the hash value of the first logic to the second vehicle controller 20, and the second vehicle controller 20 transmits the hash value of the second logic to the first vehicle controller 10. Thereafter, the first vehicle controller 10 may determine the authenticity of the hash value of the second logic based on the hash table, and the second vehicle controller 20 determines the authenticity of the hash value of the first logic based on the hash table.

In this manner, the first vehicle controller 10 verifies the integrity of the second logic of the second vehicle controller 20, and the second vehicle controller 20 also verifies the integrity of the first logic of the first vehicle controller 10, so that it is possible to guarantee the integrity of the app installed in each of the first and second vehicle controllers 10 and 20.

In addition, in the process of communicating between the first logic of the first vehicle controller 10 and the second logic of the second vehicle controller 20, an encryption process may be accompanied to maintain confidentiality. For example, the hash value for the first logic of the first vehicle controller 10 may be encrypted with a session key, and the second vehicle controller 20 may decrypt the hash value for the first logic with the session key. In this case, the generation of the session key may be implemented through a key agreement process between the first vehicle controller 10 and the second vehicle controller 20. In one embodiment, the key agreement operation may be performed based on, for example, Elliptic Curve Diffie Hellman Ephermeral (ECDHE). Hereinafter, an ECDHE-based handshake operation is described with reference to FIG. 2.

Figure 2:
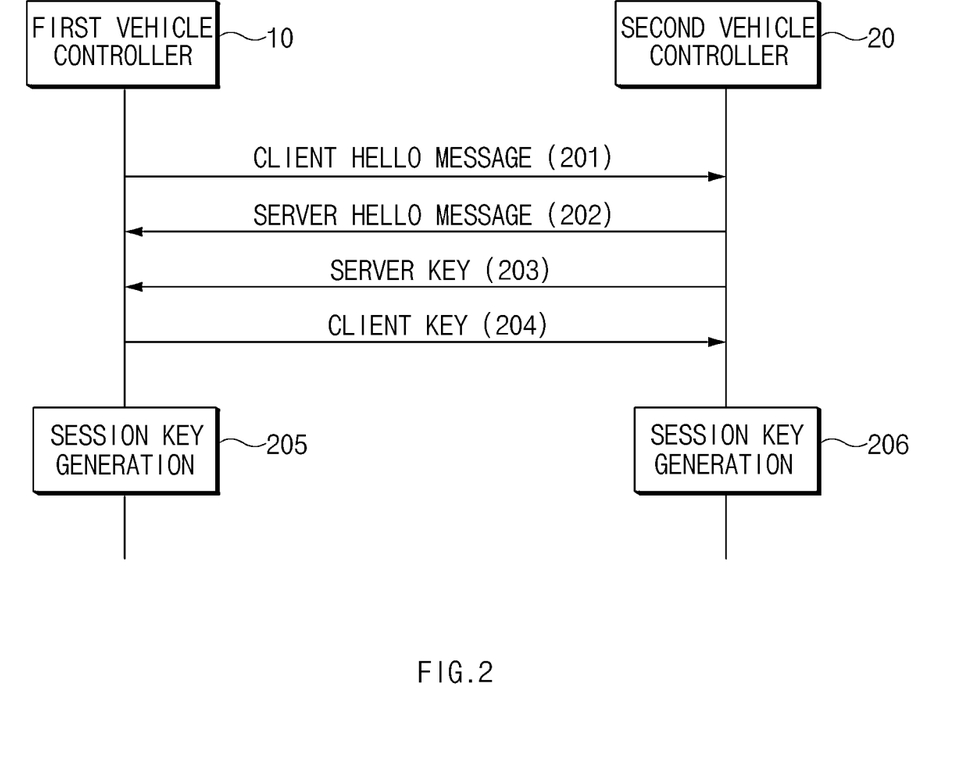
FIG. 2 is a diagram illustrating a session key generation process according to an embodiment of the present disclosure.

FIG. 2 is a diagram illustrating a session key generation process according to an embodiment of the present disclosure. In particular, FIG. 2 illustrates the session key generation process between the first vehicle controller 10 and the second vehicle controller 20. In this case, the client refers to the first vehicle controller 10 and the server refers to the second vehicle controller 20.

First, when the first vehicle controller 10 intends to transmit data to the second vehicle controller 20, the first vehicle controller 10 transmits a client hello message to the second vehicle controller 20 in 201. In this case, the client hello message may include a client random, a protocol version supported by the client, a client cipher suite list, a curve list, and the like. In this case, the client random refers to a random variable.

Thereafter, in 202, the second vehicle controller 20 determines the protocol version, encryption suite and curve after receiving the client hello message, and transmits the server hello message including the server random, encryption suite and server certificate to the first vehicle controller 10. In this case, the server random means a random variable.

In addition, in 203, the second vehicle controller 20 generates a server DH parameter for Diffie Hellman (DH) key exchange, signs the server DH parameter with its own private key (private key), and transmits the signed server DH parameter to the first vehicle controller 10.

Thereafter, in 204, the first vehicle controller 10 verifies the certificate of the server, verifies the signature of the server DH parameter, and transmits the client DH parameter to the second vehicle controller 20.

Thereafter, in 205 and 206, the first vehicle controller 10 and the second vehicle controller 20 generate a premaster secret value by using the client DH parameter and the server DH parameter, respectively, and combine the premaster secret value, the client random and the server random to generate a session key.

Meanwhile, the app installed in each vehicle controller 10, 20, or 30 may be changed partially or overall for various reasons (e.g., over-the-air (OTA)-based update, OTA-based upgrade, and the like). When all or part of the app is changed, the logic is changed accordingly, so that the hash value of the logic is changed. For reference, because the scheme of calculating the hash value of each logic itself is not the subject of the present disclosure, any scheme among well-known and common techniques may be used.

For example, when the hash value of the logic of the first vehicle controller 10 is changed, the first vehicle controller 10 transmits the hash value before and after the change to the remaining vehicle controllers 20 and 30 in order to change the hash values of the logic of the first vehicle controller 10 in the hash tables respectively provided in the remaining vehicle controllers 20 and 30. The reason for transmitting the hash value before the change is that the remaining vehicle controllers 20 and 30 search for the logic of the first vehicle controller 10 to be changed in the hash tables of them to verify the integrity of the logic of the first vehicle controller 10.

Thereafter, when the integrity of the logic of the first vehicle controller 10 is verified, the remaining vehicle controllers 20 and 30 may transmit a response (ACK) message to the first vehicle controller 10. Then, the first vehicle controller 10 that has received the response message transmits the hash value after the change, and the remaining vehicle controllers 20 and 30 that have received the response message changes the hash value of the logic of the first vehicle controller 10 in their hash tables, respectively.

After the change of the hash value is completed in this manner, each of the remaining vehicle controllers 20 and 30 calculates a digest (i.e., an output value of a hash function, a hash value) of the hash table, and transmits the digest to the first vehicle controller 10.

Thereafter, the first vehicle controller 10 compares the digest of the hash table of the first vehicle controller 10 with the digests received from the remaining vehicle controllers 20 and 30 and transmits an OK signal to the remaining vehicle controllers 20 and 30 when the digests are identical with each other.

Through this process, the vehicle controllers 10, 20, and 30 may have the same hash table, thereby ensuring the integrity of the apps installed in the vehicle controllers 10, 20, and 30, respectively.

Figure 3:
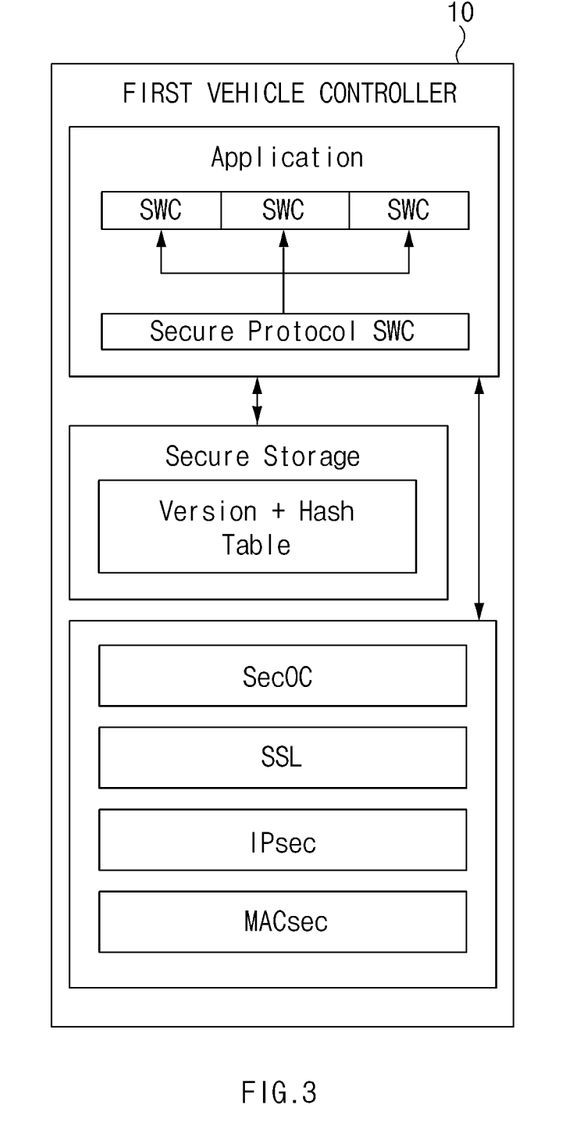
FIG. 3 is a diagram illustrating an architecture of each autonomous driving-related vehicle controller to which an embodiment of the present disclosure is applied.

FIG. 3 is a diagram illustrating the architecture of each autonomous driving-related vehicle controller to which an embodiment of the present disclosure is applied. Because all of the vehicle controllers have the same architecture, the first vehicle controller 10 is described below as a representative example.

As shown in FIG. 3, the first vehicle controller 10 may include media access control security (MACsec), Internet protocol security (IPsec), secure sockets layer (SSL), secure onboard communication (SecOC), and the like as a security protocol.

In this case, the MACsec, which is a protocol that provides point-to-point security for an Ethernet link between directly connected nodes, is standardized in Institute of Electrical and Electronics Engineers (IEEE) 820.1AE. The MACsec may also be used together with other security protocols such as IPsec and SSL to provide end-to-end network security. In addition, the MACsec may identify and prevent most security threats including denial of service, intrusion, man-in-the-middle, masquerading, passive wiretapping, and playback attacks. In addition, because the MACsec is limited to link layer discovery protocol (LLDP), link aggregation control protocol (LACP), dynamic host configuration protocol (DHCP), address resolution protocol (ARP), and other security solutions may be used together so that it is possible to protect Ethernet Links for all traffics.

The IPsec, which is a standard Internet protocol suite for secure IP communication, is responsible for authentication, data integrity guarantee, encryption, and the like to secure the communication between nodes. The IPSec is standardized by the Internet Engineering Task Force (IETF) and is designed to provide security services that guarantee access control, connectionless integrity for message forgery prevention, retransmission attack prevention, and the like. In addition, the IPsec includes two protocols of authentication header (AH) and encapsulated security payload (ESP). The AH operates to ensure authentication header and data integrity, and the ESP is responsible for data encryption service through encapsulation.

The SSL, which is an Internet communication protocol for securely transmitting data on the Internet, was developed to overcome the problem that the Internet protocol does not maintain confidentiality in terms of security. The SSL is the most used protocol for maintaining the security of personal information and credit card information required for Internet commerce.

The SecOC, which is a protocol that verifies communication between vehicle controllers, may prevent a message from being tampered with during a replay attack and transmission. In addition, the SecOC may prevent the modulation of a message value that causes an abnormal operation in the vehicle.

In addition, the vehicle controller 10 may include a secure storage for storing version information and a hash table. In this case, the version information may include version information of each of the vehicle controllers 10, 20, and 30 and version information of each logic of the vehicle controllers 10, 20, and 30. For example, the secure storage may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, an optical disk type memory and the like.

In addition, the first vehicle controller 10 may include a module (Secure Protocol SWC) for applying a security protocol to a software component (SWC) on the application layer. In this case, the SWC means the logic that constitutes an app.

Figure 4:
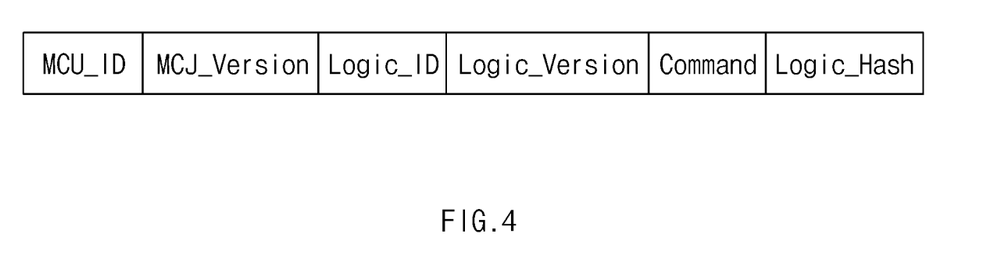
FIG. 4 is a diagram illustrating information included in a packet used in an app integrity verification process of a vehicle controller according to an embodiment of the present disclosure.

FIG. 4 is a diagram illustrating information included in a packet used in an app integrity verification process of a vehicle controller according to an embodiment of the present disclosure.

As shown in FIG. 4, the packet used in the app integrity verification process of the vehicle controller may include vehicle controller identification information (MCU_ID), vehicle controller version information (MCU_Version), logic identification information (Logic_ID), logic version information (Logic_Version), a command, and a hash value of logic (Logic Hash) In this case, the command may include an integrity verification request for transmission logic and reception logic of data when the first vehicle controller 10 intends to transmit data to the second vehicle controller 20, or the update request of the hash tables from the remaining vehicle controllers 20 and 30 when the hash value of logic of the first vehicle controller 10 is changed. In this case, because the process of requesting an update of the hash table for the logic includes an integrity verification process (digest comparison process) of the hash table, the process may be included in the category of the integrity verification request for the logic.

Figure 5:
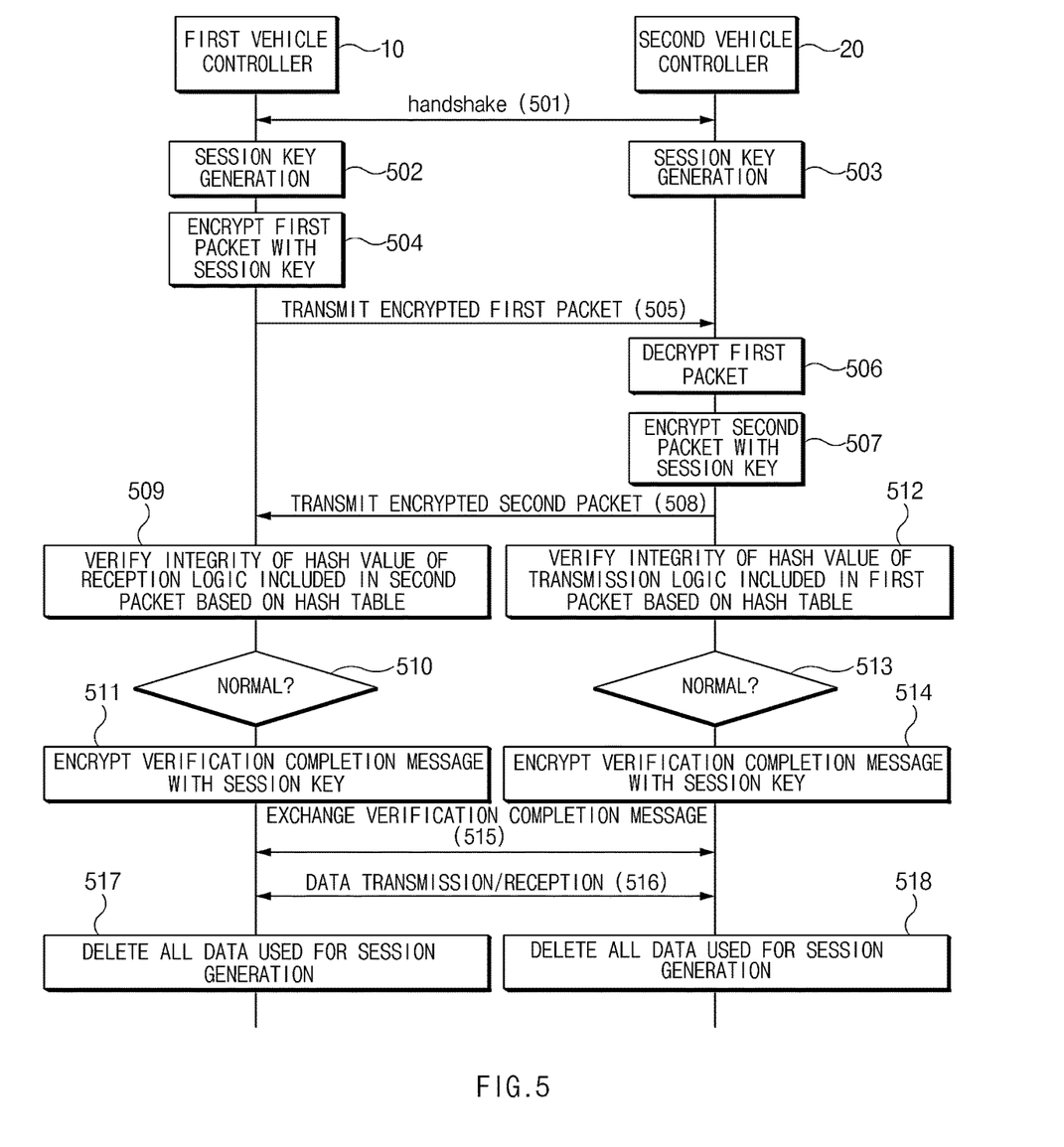
FIG. 5 is a flowchart illustrating a method of verifying app integrity of a vehicle controller according to an embodiment of the present disclosure.

FIG. 5 is a flowchart illustrating a method of verifying app integrity of a vehicle controller according to an embodiment of the present disclosure. FIG. 5 illustrates a process of verifying the integrity of the data transmission logic of the first vehicle controller 10 and the integrity of the data reception logic of the second vehicle controller 20 when the first vehicle controller 10 tries to transmit data to the second vehicle controller 20.

First, as shown in FIG. 2, in 501, 502 and 503, each of the first vehicle controller 10 and the second vehicle controller 20 generates a session key through the handshake process. In this case, the session key generated by the first vehicle controller 10 is identical with the session key generated by the second vehicle controller 20.

Then, in 504, the first vehicle controller 10 encrypts the first packet with the session key. In other words, the first vehicle controller 10 may encrypt the hash value of the transmission logic with the session key. In this case, the first packet may include information as shown in FIG. 4. In this case, the command included in the first packet may be an integrity verification request of the transmission logic of the first vehicle controller 10.

Thereafter, in 505, the first vehicle controller 10 transmits the encrypted first packet to the second vehicle controller 20.

Thereafter, in 506, the second vehicle controller 20 decrypts the first packet with the session key to confirm information included in the first packet.

Thereafter, in 507, the second vehicle controller 20 encrypts the second packet with the session key. In other words, the second vehicle controller 20 encrypts the hash value of the reception logic with the session key. In this case, the second packet may include information as shown in FIG. 4. In this case, the command included in the second packet may be an integrity verification request for the reception logic of the second vehicle controller 20.

Thereafter, in 508, the second vehicle controller 20 transmits the encrypted second packet to the first vehicle controller 10.

Thereafter, in 509, 510 and 511, the first vehicle controller 10 verifies the integrity of the hash value of the reception logic included in the second packet based on the hash table of the first vehicle controller 10. When the hash value is normal, the first vehicle controller 10 encrypts the verification completion message with the session key. In this case, the first vehicle controller 10 may decrypt the encrypted second packet with the session key.

Similarly, in 512, 513 and 514, the second vehicle controller 20 verifies the integrity of the hash value of the transmission logic included in the first packet based on the hash table of the second vehicle controller 20. When the hash value is normal, the second vehicle controller 20 encrypts the verification completion message with the session key.

Thereafter, in 515, the first vehicle controller 10 and the second vehicle controller 20 exchange each other's verification completion messages.

Through this process, the integrity of the transmission logic of the first vehicle controller 10 and the integrity of the reception logic of the second vehicle controller 20 are verified, and the integrity of the app installed in each of the first vehicle controller 10 and the second vehicle controller 20 is eventually verified.

Thereafter, when data transmission/reception between the first vehicle controller 10 and the second vehicle controller 20 is completed in 516 (i.e., when the session ends), each of the first vehicle controller 10 and the second vehicle controller 20 deletes all data (e.g., the session key, hash value, received packet, and the like) used for session generation in 517 and 518.

Figure 6:
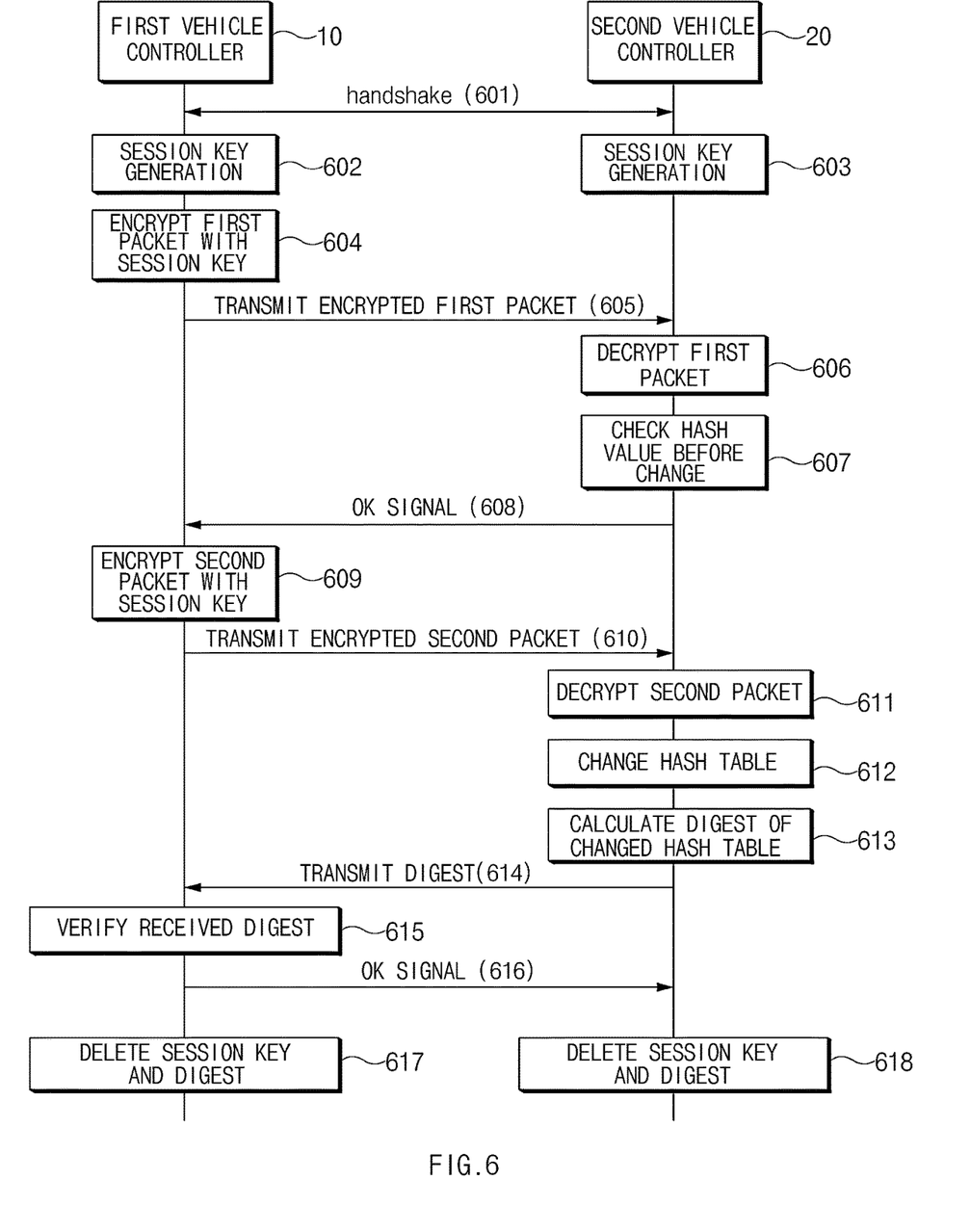
FIG. 6 is a flowchart illustrating a method of verifying app integrity of a vehicle controller according to another embodiment of the present disclosure.

FIG. 6 is a flowchart illustrating a method of verifying app integrity of a vehicle controller according to another embodiment of the present disclosure. FIG. 6 illustrates a process of changing the hash value of the logic in the hash table possessed by the remaining vehicle controllers 20 and 30 when the hash value of the logic of the first vehicle controller 10 is changed. In this case, although the second vehicle controller 20 is exemplified as a remaining vehicle controller, it may be understood that the hash table may be changed in the same manner even though the number of remaining vehicle controllers increases.

First, in 601, 602 and 603, each of the first vehicle controller 10 and the second vehicle controller 20 generates a session key through a handshake process as shown in FIG. 2. In this case, the session key generated by the first vehicle controller 10 is identical with the session key generated by the second vehicle controller 20.

Then, in 604, the first vehicle controller 10 encrypts the first packet with the session key (604). In other words, the first vehicle controller 10 may encrypt the hash value before change with the session key. In this case, the first packet may include information as shown in FIG. 4. In this case, the command included in the first packet may be an update request for the hash value of the changed logic.

Thereafter, in 605, the first vehicle controller 10 transmits the encrypted first packet to the second vehicle controller 20.

Thereafter, the second vehicle controller 20 decrypts the first packet with the session key in 606. When the hash value of the logic included in the first packet is retrieved from its hash table in 607, the second vehicle controller 20 transmits an OK signal to the first vehicle controller 10 in 608. In this case, the second vehicle controller 20 may encrypt the OK signal with the session key.

Thereafter, in 609, the first vehicle controller 10 encrypts the second packet with the session key. In this case, the second packet may include a hash value after change.

Thereafter, in 610, the first vehicle controller 10 transmits the encrypted second packet to the second vehicle controller 20.

Thereafter, the second vehicle controller 20 decrypts the second packet with the session key in 611, changes the hash table by using the hash value (the hash value after the change) of the logic included in the second packet in 612, and calculates a digest (hash value) of the changed hash table in 613.

Thereafter, in 614, the second vehicle controller 20 transmits the digest to the first vehicle controller 10. In this case, the second vehicle controller 20 may encrypt the digest with the session key.

Thereafter, in 615, the first vehicle controller 10 verifies the digest received from the second vehicle controller 20. In other words, the first vehicle controller 10 calculates the digest of its hash table, and when the digest of its hash table and the digest received from the second vehicle controller 20 are identical with each other, the first vehicle controller 10 transmits an OK signal to the second vehicle controller 20 in 616. In this case, the second vehicle controller 20 may encrypt the OK signal with the session key.

Through this process, when the hash value of the logic of the first vehicle controller 10 is changed, the process of changing the hash values of the logic in the hash tables of the remaining vehicle controllers 20 and 30 is completed. Such a process may be performed in all vehicle controllers related to autonomous driving. Therefore, all vehicle controllers related to autonomous driving have the same hash table.

Thereafter, in 617, the first vehicle controller 10 deletes the session key and the digest (i.e., the digest calculated by itself and the received digest).

Similarly, when receiving the OK signal from the first vehicle controller 10, the second vehicle controller 20 deletes the session key and the digest (i.e., the digest calculated by itself) in 618.

Figure 7:
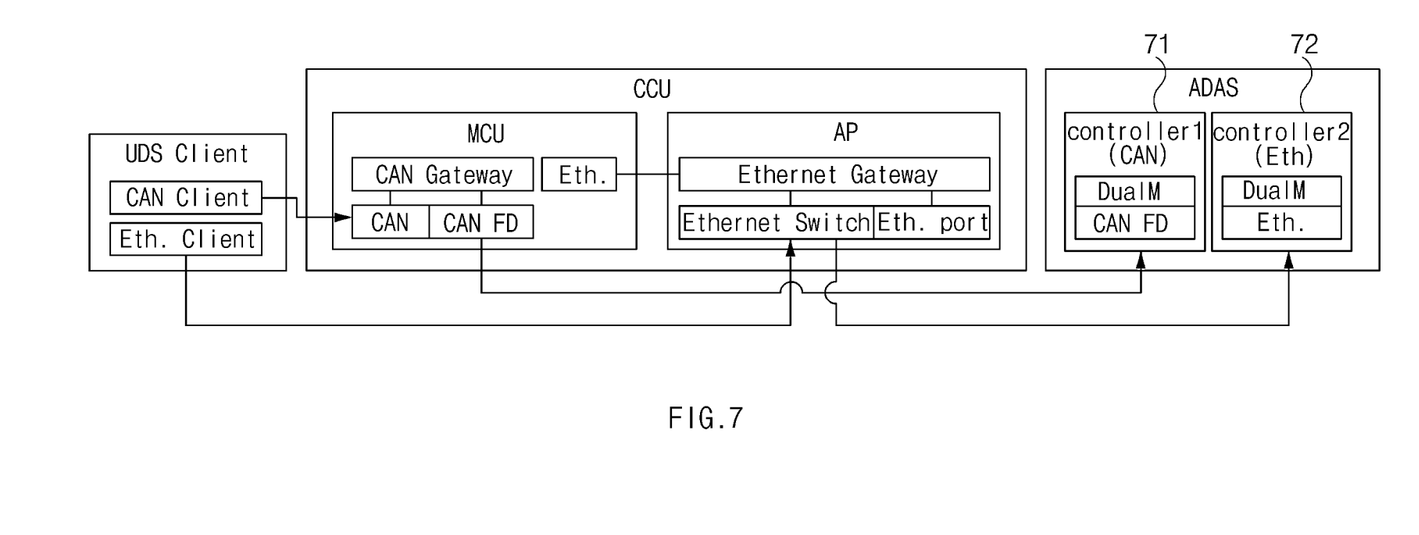
FIG. 7 is a diagram illustrating an F-OTA architecture of autonomous driving-related vehicle controllers to which an embodiment of the present disclosure is applied.

FIG. 7 is a diagram illustrating an F-OTA architecture of autonomous driving-related vehicle controllers to which an embodiment of the present disclosure is applied.

As shown in FIG. 7, a controller 1 (71) provided in an autonomous driving assistance system (ADAS) performs a firmware over the air (F-OTA) function through a CAN gateway of MCU in a central communication unit (CCU) from the CAN client of a unified diagnostic service (UDS) client. In this case, the F-OTA of the controller 1 (71) conforms to the AUTOSAR specification as an example.

The controller 1 (71) may include a controller area network with flexible data-rate (CAN FD), a dual memory control application (DualM) and a flash memory driver.

A controller 2 (72) provided in the ADAS controller performs the F-OTA function through the Ethernet gateway of the AP in the CCU from the Ethernet client of the UDS client. In this case, the F-OTA of the controller 2 (72) conforms to the Linux architecture as an example.

The controller 2 (72) may include a middleware application and a flash memory driver conforming to an Ethernet protocol (e.g., EthDiag) or a diagnostic over Internet protocol (DoIP).

Figure 8:
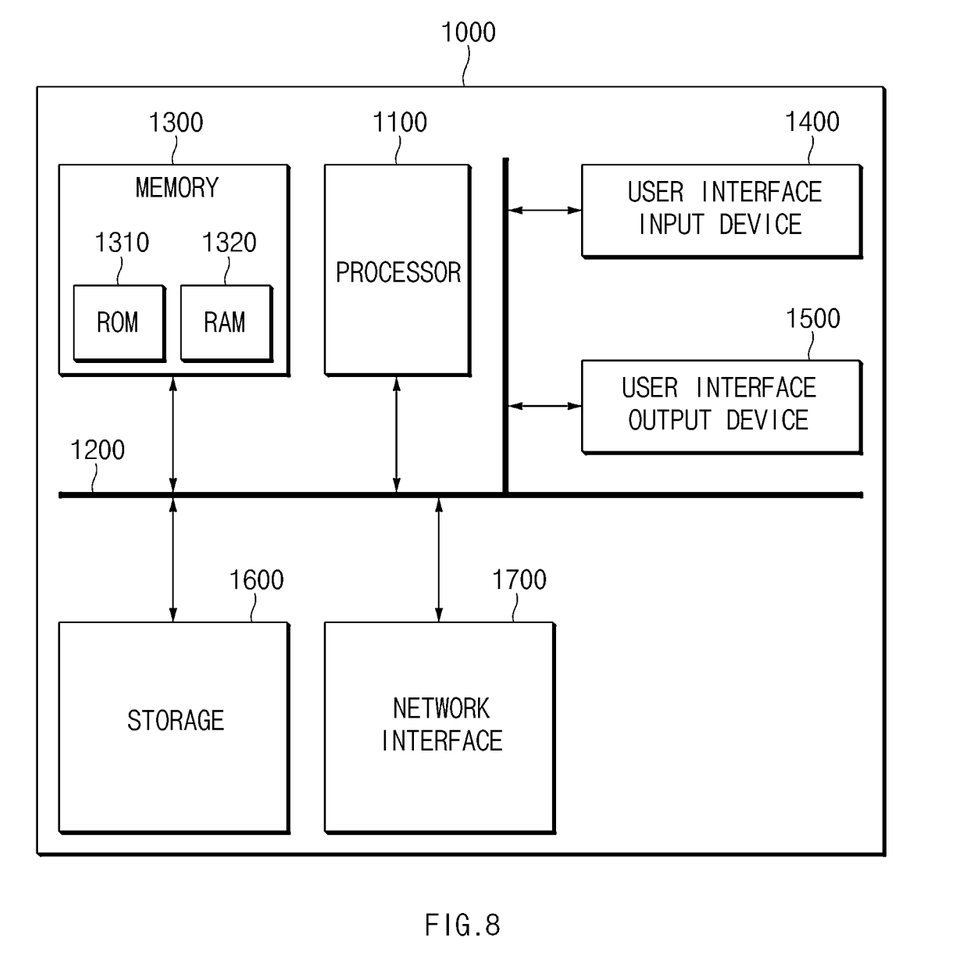
FIG. 8 is a block diagram illustrating a computing system for executing a method of verifying integrity of an app for a vehicle controller according to an embodiment of the present disclosure.

FIG. 8 is a block diagram illustrating a computing system for executing a method of verifying integrity of an app for a vehicle controller according to an embodiment of the present disclosure.

Referring to FIG. 8, the method of verifying integrity of an app for a vehicle controller according to each embodiment of the present disclosure described above may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the method of verifying integrity of an app for a vehicle controller of an embodiment, autonomous driving-related vehicle controllers each have the same hash table, and when communicating between the first logic of the first vehicle controller and the second logic of the second vehicle controller, the hash value of the first logic and the hash value of the second logic are exchanged. The first vehicle controller determines whether the hash value of the second logic is true based on the hash table of the first vehicle controller, and the second vehicle controller may determine whether the hash value of the first logic is true based on the hash table of the second vehicle controller, so that it is possible to ensure the integrity of the apps installed in the autonomous driving-related vehicle controllers.

In addition, according to the method of verifying integrity of an app for a vehicle controller of another embodiment, autonomous driving-related vehicle controllers each have the same hash table, and when the hash value of the logic of the first vehicle controller is changed, the hash value before the change and the hash value after the change are transmitted to the remaining vehicle controllers. Each of the remaining vehicle controllers may change the hash value for the logic of the first vehicle controller in the hash tables of them, so that it is possible to ensure the integrity of the apps installed in the autonomous driving-related vehicle controllers.

Although some embodiments of the present disclosure have been described for illustrative purposes, those having ordinary skill in the art should appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A method of verifying integrity of an app for a vehicle controller, the method comprising: providing each of autonomous driving-related vehicle controllers with a hash table in which hash values for logic of the autonomous driving-related vehicle controllers are recorded; transmitting, by a first vehicle controller, an old hash value and a new hash value to a second vehicle controller when a hash value for logic of the first vehicle controller is changed; and changing, by the second vehicle controller, the old hash value to the new hash value in a hash table provided in the second vehicle controller, wherein transmitting the old hash value and the new hash value includes: generating, by the first vehicle controller and the second vehicle controller, a session key; encrypting, by the first vehicle controller, the old hash value with the session key and transmitting to the second vehicle controller; receiving, by the first vehicle controller, an OK signal from the second vehicle controller; and encrypting, by the first vehicle controller, the new hash value with the session key and transmitting an encrypted new hash value to the second vehicle controller, and wherein generating the session key includes: transmitting, by the first vehicle controller, a first Diffie Hellman (DH) parameter and a first random variable to the second vehicle controller; transmitting, by the second vehicle controller, a second DH parameter and a second random variable to the first vehicle controller; generating, by the first vehicle controller, a premaster secret value by using the first DH parameter and the second DH parameter, and combining the premaster secret value with the first random variable and the second random variable to generate the session key; and generating, by the second vehicle controller, a premaster secret value by using the first DH parameter and the second DH parameter, and combining the premaster secret value with the first random variable and the second random variable to generate the session key.

2. The method of claim 1, wherein receiving the OK signal includes: decrypting, by the second vehicle controller, the old hash value with the session key; and transmitting, by the second vehicle controller, the OK signal to the first vehicle controller when the old hash value exists in the hash table of the second vehicle controller.

3. The method of claim 1, wherein changing the old hash value to the new hash value includes: decrypting, by the second vehicle controller, the old hash value with the session key; decrypting, by the second vehicle controller, the new hash value with the session key; searching, by the second vehicle controller, the hash table of the second vehicle controller for the old hash value; and changing, by the second vehicle controller, the old hash value to the new hash value in the hash table of the second vehicle controller.

4. The method of claim 1, further comprising:
calculating, by the second vehicle controller, a digest of the changed hash table;
transmitting, by the second vehicle controller, the digest to the first vehicle controller;
calculating, by the first vehicle controller, a digest of the hash table of the first vehicle controller; and
transmitting, by the first vehicle controller, an OK signal to the second vehicle controller when the received digest is identical with the digest of the hash table of the first vehicle controller.

5. The method of claim 4, further comprising: deleting, by the first vehicle controller, the digest; and deleting, by the second vehicle controller, the digest when the OK signal is received from the first vehicle controller.

6. A method of verifying integrity of an app for a vehicle controller, the method comprising: providing each of autonomous driving-related vehicle controllers with a hash table in which hash values for logic of the autonomous driving-related vehicle controllers are recorded;

exchanging a hash value of a first logic and a hash value of a second logic in communication between the first logic of a first vehicle controller and the second logic of a second vehicle controller;

verifying, by the first vehicle controller, integrity of the hash value of the second logic based on a hash table of the first vehicle controller; and verifying, by the second vehicle controller, integrity of the hash value of the first logic based on a hash table of the second vehicle controller, wherein exchanging the hash values includes: generating, by the first vehicle controller and the second vehicle controller, a session key; encrypting, by the first vehicle controller, the hash value of the first logic with the session key; and encrypting, by the second vehicle controller, the hash value of the second logic with the session key, and wherein generating the session key includes: transmitting, by the first vehicle controller, a first Diffie Hellman (DH) parameter and a first random variable to the second vehicle controller; transmitting, by the second vehicle controller, a second DH parameter and a second random variable to the first vehicle controller; generating, by the first vehicle controller, a premaster secret value by using the first DH parameter and the second DH parameter, and combining the premaster secret value with the first random variable and the second random variable to generate the session key; and generating, by the second vehicle controller, a premaster secret value by using the first DH parameter and the second DH parameter, and combining the premaster secret value with the first random variable and the second random variable to generate the session key.

7. The method of claim 6, wherein verifying the integrity of the hash value of the first logic includes: encrypting, by the second vehicle controller, a verification completion message with a session key when the integrity of the hash value of the first logic is verified; and transmitting, by the second vehicle controller, the encrypted verification complete message to the first vehicle controller.

8. The method of claim 7, wherein verifying the integrity of the hash value of the first logic further includes: deleting, by the second vehicle controller, all data used for session generation when a session is terminated.

9. The method of claim 6, wherein verifying the integrity of the hash value of the second logic includes: encrypting, by the first vehicle controller, a verification completion message with a session key when the integrity of the hash value of the second logic is verified; and transmitting, by the first vehicle controller, the encrypted verification complete message to the second vehicle controller.

10. The method of claim 9, wherein verifying the integrity of the hash value of the first logic further includes: deleting, by the first vehicle controller, all data used for session generation when a session is terminated.

* * * * *